(12) United States Patent
Da Rosa

(10) Patent No.: US 12,024,633 B2
(45) Date of Patent: Jul. 2, 2024

(54) PROCESS FOR PURIFYING LEUCOINDIGO SALT SOLUTIONS USING AN INERT GAS

(71) Applicant: BANN QUÍMICA LTDA., Paulínia-SP (BR)

(72) Inventor: Paulo Cesar Da Rosa, Limeira-SP (BR)

(73) Assignee: BANN QUIMICA LTDA., Paulinia-SP (BR)

( * ) Notice: Subject to any disclaimer, the term of this patent is extended or adjusted under 35 U.S.C. 154(b) by 260 days.

(21) Appl. No.: 17/780,864

(22) PCT Filed: Oct. 1, 2020

(86) PCT No.: PCT/BR2020/050394
§ 371 (c)(1),
(2) Date: Jan. 5, 2023

(87) PCT Pub. No.: WO2021/102530
PCT Pub. Date: Jun. 3, 2021

(65) Prior Publication Data
US 2023/0123640 A1    Apr. 20, 2023

(30) Foreign Application Priority Data
Nov. 28, 2019   (BR) .................. 10 2019 025172-7

(51) Int. Cl.
*C09B 67/00* (2006.01)
*B01D 3/34* (2006.01)
(Continued)

(52) U.S. Cl.
CPC .......... *C09B 67/0096* (2013.01); *B01D 3/346* (2013.01); *B01D 3/38* (2013.01); *B01D 19/0409* (2013.01); *C09B 7/02* (2013.01)

(58) Field of Classification Search
CPC ... C09B 67/0096; C09B 7/02; C09B 67/0078; C09B 67/0083; B01D 3/346; B01D 3/38; B01D 19/0409; B01D 19/02
(Continued)

(56) References Cited

U.S. PATENT DOCUMENTS

| | | | |
|---|---|---|---|
| 5,116,996 A | 5/1992 | Kohlhaupt et al. | |
| 6,428,581 B1 | 8/2002 | Gang et al. | |
| 2020/0247999 A1* | 8/2020 | Lucic ...................... | D06P 1/228 |

FOREIGN PATENT DOCUMENTS

| | | |
|---|---|---|
| CA | 2353109 A1 | 1/2003 |
| EP | 3441429 | 2/2019 |

(Continued)

OTHER PUBLICATIONS

WIPO, International Search Report for International Application No. PCT/BR2020/050394, Dec. 22, 2020.
(Continued)

*Primary Examiner* — Eisa B Elhilo
(74) *Attorney, Agent, or Firm* — Hodgson Russ LLP

(57) ABSTRACT

The present invention refers to a process for purifying leucoindigo salt solutions, for removal of aromatic amines, particularly aniline and N-methylaniline, comprising: adding to a purification vessel a leucoindigo salt solution containing aromatic amines, said solution in the form of a stationary mass; bubbling with a controlled flow rate an inert gas in the purification vessel, by means of a device submerged at the surface of the stationary mass; injecting with a controlled flow rate a gas purification current into the vessel, by means of a device submerged at the stationary mass; and recovering the purified solution from the vessel. It also refers to the use of inert gas in a process for purifying
(Continued)

leucoindigo salt solutions, acting as a gas anti-foaming agent, to reduce foam and chances of product stripping during processing.

13 Claims, 1 Drawing Sheet

(51) Int. Cl.
- *B01D 3/38* (2006.01)
- *B01D 19/04* (2006.01)
- *C09B 7/02* (2006.01)
- *C09B 67/54* (2006.01)

(58) Field of Classification Search
USPC .................................................. 8/438, 653
See application file for complete search history.

(56) References Cited

FOREIGN PATENT DOCUMENTS

| | | | |
|---|---|---|---|
| EP | 3441429 A1 * | 2/2019 | ......... C09B 67/0096 |
| EP | 3441431 | 2/2019 | |
| KR | 20200040278 A * | 4/2020 | ............... C09B 7/02 |
| WO | 2004024826 | 3/2004 | |
| WO | WO 2004024826 A2 * | 3/2004 | ............... C09B 7/02 |
| WO | 2019002326 A1 | 1/2019 | |
| WO | 2019030391 | 2/2019 | |
| WO | 2019030396 | 2/2019 | |
| WO | 2019030397 | 2/2019 | |

OTHER PUBLICATIONS

McGlynn, "Evaluating Defoaming Agents for the Stripping Columns at the In-Tank Precipitation Facility." United States: N.p., 1993.

* cited by examiner

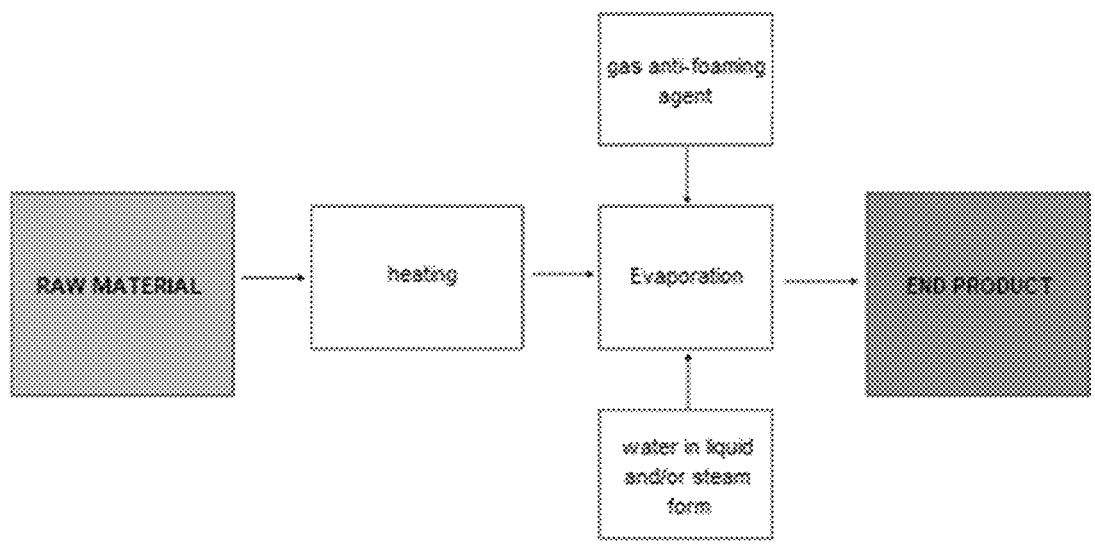

PROCESS FOR PURIFYING LEUCOINDIGO SALT SOLUTIONS USING AN INERT GAS

CROSS-REFERENCE TO RELATED APPLICATIONS

This application is a U.S. national stage entry of International Application No. PCT/BR2020/050394, filed Oct. 1, 2020, which claims priority to Brazilian Application No. 10 2019 025172-7, filed Nov. 28, 2019, the entire disclosures of which are incorporated herein by reference.

FIELD OF THE INVENTION

The present invention refers to a process for purifying leucoindigo salt solutions. Particularly, the process refers to the reduction of the amounts of aromatic amines by means of extraction by stripping. The present invention also refers to the use of an inert gas, in a process for purifying leucoindigo salt solutions, as a gas anti-foaming agent.

BACKGROUND OF THE ART

Dyes such as indigo are among the oldest dyes used by humanity.

In olden times, indigo dye used to be extracted exclusively from plants, such as *Indigofera tinctoria* and *Isatis tinctoria*. Only after its synthesis route was discovered in 1880 by German chemist Johann Friedrich Wilhelm Adolf von Baeyer and after its manufacturing process became feasible on an industrial scale by BASF in 1897, did this dye become one of the most commercialized in the world, being the principal one responsible for blue coloring of the jeans-type fabric.

Since indigo is insoluble in water, the dyeing of fabrics with this dye involves the reduction of indigo to leucoindigo, a greenish solution in which the fabrics to be dyed are impregnated, and subsequent exposure of these fabrics to air, for oxidizing the leucoindigo to indigo, whereby restoring the desired blue color.

Due to its synthesis, however, the indigo produced synthetically contains aromatic amines as impurities, such as aniline and N-methylaniline, which remain in the leucoindigo solutions generated.

Accordingly, the industry has an interest in removing the aromatic amines from the leucoindigo solutions.

Processes for purifying leucoindigo solutions and/or processes for reducing the content of aromatic amines from these solutions have already been described in the state of the art.

International publication WO 2004/024826 refers to processes for purifying indigo and leucoindigo solutions. However, the concentration of leucoindigo in the end solution decreases as the purification process is carried out.

International publications WO 2019/030397, WO 2019/030391 and WO 2019/030396 propose methods for extracting aromatic amines from leucoindigo salt solutions by means of purification techniques known to a person skilled in the art, in particular by distillation, with addition of amounts of water to the solution to be purified. In using large amounts of water, there is an increase in the mass to be processed, generating economic disadvantages of the process.

In this sense, the state of the art still lacks a purification process of leucoindigo salt solutions containing aromatic amines, which result in leucoindigo salt solutions containing undetectable amounts of said amines and that have process economicity.

Although there is no conclusive technical explanation about the mechanism that triggers the generation of foam when boiling leucoindigo solutions, it is a fact that this generation of foam entails major difficulties, when it does not render altogether unfeasible, processes where said solution has to be boiled. Such difficulties are mentioned in international publications WO 2019/030397, WO 2019/030391 and WO 2019/030396 which discuss methods and attempts at purifying leucoindigo solutions. Attempts to purify leucoindigo salt solutions containing aromatic amines faced a problem related to foam formation, since the presence of said foam hampers the transfer of mass from the aromatic amines from the liquid phase to the gaseous phase, decreasing the efficiency of the purification process, and even make it impossible to continue the removal of said amines.

Further in relation to the problems that foam formation in the process may cause, what occurs is a phenomenon known industrially in evaporative processes, stripping. Stripping occurs when part or even all the product initially loaded in the vessel, transfers in the liquid state, to the vessel destined to receive the condensate, whereby causing loss of yield and productivity, rise of process costs, safety problems, and quality problems.

More particularly, when foam formation occurs frequently and without due control, the process becomes unfeasible.

Although the state of the art suggests the use of anti-foaming agents, such as silicone derivatives, to address the problem related to foam formation, these products interfere with the quality and purity of the end product, and impact the content of solids in the end solution and in the cost of the purification process (see for example Ullmann's Encyclopedia of Industrial Chemistry, fifth edition, 1988, page 483).

Further, the inventors of the present application noted that the use of anti-foaming agents cause an increase in the content of insolubles in the end product, which results in a large problem/drawback for the industry, since the end product contains a strict specification to be respected relating to this parameter.

So there is visible need to develop new processes of purifying leucoindigo salt solutions, containing aromatic amines, by means of which it is possible to obtain lower amounts of these amines, without altering the concentration of leucoindigo salt during the process, and that are economically viable, and that further solves the problems noted in the state of the art relative to foam formation in leucoindigo purification processes.

SUMMARY OF THE INVENTION

Accordingly, it is an objective of the present invention to provide a process for purifying leucoindigo salt solutions, containing aromatic amines, particularly aniline and N-methylaniline, in which said aromatic amines are reduced to undetectable amounts in the end product.

Particularly, the present invention refers to a process for purifying leucoindigo salt solutions, for removal of aromatic amines, which comprises the steps of:
(a) adding to a purification vessel a leucoindigo salt solution containing aromatic amines;
(b) bubbling, with a controlled flow rate, an inert gas in the purification vessel, by means of a device submerged at the surface of the stationary mass;

(c) injecting, with a controlled flow rate, an extraction gas current into the vessel; and (d) recovering a solution leucoindigo salt purified from the vessel.

In a second aspect, the present invention refers to the use of an inert gas, in processes for purifying leucoindigo salt solutions, such as "gas anti-foaming agent" which, differently to the teachings of the state of the art would lead us to conclude, proves extremely efficient relative to the elimination of the occurrence of foam during boiling of the leucoindigo solution and, consequently, assures the feasibility of the entire productive process described herein.

SUMMARY DESCRIPTION OF THE DRAWINGS

The objectives, technical effects and advantages of the present invention will be apparent to persons skilled in the art based on the detailed description below, making references to the accompanying drawings, which illustrate exemplary but non-limitative embodiments of the process of the present invention:

FIG. 1 shows a flowchart depicting the purification process of the present invention: the raw material, a leucoindigo salt solution containing aromatic amines is loaded into the reaction vessel, then heating for evaporation of water and aromatic amines begins. The evaporation of water with aromatic amines occurs simultaneously with the continuous injection of gaseous defoamer and continuous replacement of water in liquid and/or vapor form. Finally, the final product is obtained, a purified leucoindigo salt solution, with undetectable amounts of aromatic amines.

DETAILED DESCRIPTION OF THE INVENTION

The present invention refers to a process for purifying leucoindigo salt solution, for removal of aromatic amines, which comprises the steps of:

(a) adding to a purification vessel a leucoindigo salt solution containing aromatic amines;

(b) bubbling, with a controlled flow rate, an inert gas in the purification vessel, by means of a device submerged at the surface of the stationary mass;

(c) injecting, with a controlled flow rate, an extraction gas current into the vessel; and (d) recovering a solution leucoindigo salt purified from the vessel;

wherein the purified leucoindigo salt solution, recovered after step (d), contains undetectable amounts of aromatic amines.

Usually, distillation is applied by stripping when the aim is to extract a substance of interest contained in a "base product"—example: extraction of essential oils.

Differently to what is typically practiced, the purification process of the present invention applies distillation by purification stripping the "base product" (leucoindigo salt solution containing aromatic amines), based on the removal of the undesired substance (aromatic amines) contained therein.

Particularly, the purification process of the present invention is a process of extraction by stripping.

The aromatic amines are particularly aniline and N-methylaniline.

In a preferred embodiment, the purification process of the present invention is carried out in the absence of liquid anti-foaming agents, in particular of silicone-derivative anti-foaming agents.

Preferably, steps (b) and (c) of the purification process occur simultaneously.

The process of the present invention is capable of removing said aromatic amines both by continuous processes and by batch processes, without any adverse effect on the productive capacity.

In another preferred aspect, the process of the present invention maintains constant the concentration and the composition of the stationary mass inside the reaction vessel during purification, without carrying out one or more steps of dilution.

In order to maintain the concentration and the composition of the stationary mass inside the vessel constant during extraction, water is added in a continuous and controlled manner. Said addition enables an intense and constant rate of evaporation in the means to be maintained without affecting the concentration and/or a composition of the leucoindigo solution.

The salt of the leucoindigo salt solution of step (a) is particularly selected from among alkaline metal salts, as well as a mixture thereof.

In a preferred embodiment, the leucoindigo salt is selected from among Na, K, or a mixture thereof.

Further in reference to the mixture of salts from the leucoindigo salt solution, a person skilled in the art would know how to select any one from among the ranges broadly disclosed in the state of the art. Preferably, the ratio of Na:K is from 3:1 to 1:3.

In a preferred embodiment, the leucoindigo salt solution of step (a) contains a concentration of leucoindigo salt of about 34.5% to 37.0% by weight, preferably about 35%, relative to the total weight of the solution. The vessel of step (a), preferably, contains a stirring system.

In step (b), the inert gas is bubbled so as to promote a homogeneous distribution of this gas throughout the equipment section area, whereby covering the entire surface of the stationary mass, to inhibit the formation of foam.

Particularly, the bubbling of step (b) is carried out at a flow rate of 5 to 8 Nm3/h, by means of a device sized and positioned submerged at the surface of the stationary mass such that it enables uniform and constant dispersion of the flow of the inert gas throughout the equipment section area. In one particular embodiment, foreseeing an effective uniformity of distribution, the inert gas is injected in at least three points submerged at the surface of the leucoindigo salt solution.

According to one embodiment of the present invention, the gas purification current of step (c) is selected taking into account the non-inclusion in the processing of any other substance estranged to the end product—aqueous solution containing purified leucoindigo. Preferably, the gas purification current of step (c) is live steam.

In a preferred arrangement, the gas purification current of step (c) is injected at a flow rate of 500 to 2000 kg/h, by means of a device submerged in the stationary mass, so as to promote a homogeneous distribution of this gas throughout the equipment section area from the bottom of the vessel.

The process of the present invention, through the use of the gas purification current of step (c), combined with the continuous and controlled addition of water, eliminates the significant differences between the occupancy rates at the start and at the end, typical when using batch evaporation processes, beginning with a plentifully laden process vessel but with a well diluted product, and finishing with very little product in the concentration stipulated. Additionally, the fact that the direct injection of the gas purification current in step (c), preferably live steam, characteristic of techniques of distillation by stripping, is carried out by means of a device submerged in the stationary mass, and thereby increases the productivity of the productive process, since it provides improved energy efficiency. Further, this configuration enables the process to be carried out at a constant occupancy rate, preferably about 65%, and with a constant concentration of the leucoindigo salt in the leucoindigo salt solution.

In step (c), a gas purification current is responsible for stripping the impurities (aromatic amines) from the leucoindigo salt solution.

In a preferred alternative embodiment, the process of the present invention is carried out using vacuum jointly with the use of injection of the inert gas and of the gas purification current.

Preferably, the purified leucoindigo salt solution, obtained in step (d), comprises undetectable amounts of aromatic amines. However, it must be pointed out that the process of the present invention makes it equally possible to obtain leucoindigo salt solution with any residual contents of aromatic amines, it being suffice to interrupt the purification process when the desired content is attained.

Terms

The use of the term "a" or "one" in this specification does not indicate a limited amount, but rather the existence of at least (at the minimum) one of the elements/components/items listed. The use of the term "or" indicates any one or all the elements/components/items listed. The use of the term "comprise", "endowed", "provided" or a similar term indicates that the element/component/item listed in front of said term is part of the invention, but do not exclude other elements/components/items not listed.

As used in the present specification, the expression "at least one" means one or more and, therefore, includes individual components, as well as mixtures and/or combinations.

Except in the operating examples, or where indicated otherwise, all the numbers that express reaction conditions should be understood as modified in all cases by the term "about", meaning inside +/−10% of the number indicated.

As used in this document, all the intervals provided should include all the specific intervals within and combinations of subintervals between the intervals provided. Therefore, a range from 1 to 5, for example, specifically includes 1, 2, 3, 4 and 5, as well as sub-ranges as 2 to 5, 3 to 5, 2 to 3, 2 to 4, 1 to 4, etc. All the ranges and values disclosed herein are inclusive and combinable. For example, any value or point described herein that is within a range described herein may serve as a minimum or maximum value to derive a sub-range, etc.

The processes of the present invention may comprise, consist of, or essentially consist of essential elements and limitations of the invention described herein, as well as any additional or optional ingredients, components or limitations described herein or useful.

According to the present invention, the term "vessel" means a recipient in which the purification process occurs. Preferably said vessel is a cylindrical, metal, upright body, with upper and lower cover, provided with (i) a device for homogenizing the solution (example: stirrer, pump, etc.), (ii) spouts for loading and/or unloading the product from inside the vessel, (iii) a device, internal and/or external, for heating and/or cooling the content of the vessel (example: serpentine, sleeve, etc.), (iv) spouts for connecting instruments for monitoring and controlling the purification process (example: manometers, thermometers, etc.).

The term "gas purification current" means any gas capable of stripping aromatic amines, especially aniline and N-methylaniline, but preferably that stripping also other organic substances present in the leucoindigo loaded in the vessel.

The term "live steam", in the ambit of the present invention, means water in steam state, with a sufficient calorific amount to promote the heating and/or vaporization of part of the water contained in the stationary mass contained in the vessel, introduced in submerged form directly into latter.

In the ambit of the present invention, "undetectable amounts" of said aromatic amines vary according to the detection methodology (analytic capacity of the method of qualitatively detecting—recognizing the presence of a substance) used. However, in the ambit of the present invention, "undetectable amounts" refer to a content of aromatic amines of up to 5 (five) ppm.

As used in the present application, the term "stationary mass" means all the mass loaded in the vessel, among which principally leucoindigo solution mass, which remains inside thereof for the entire purification process.

Purification Vessel

The purification process of the present invention does not employ a distillation column process, which typically corresponds to a vessel associated to a column vertical, filled with plates and/or fillings that enable the control and the quality of the steam flow which traverses the column upon subjecting said vessel to above-ambient temperature conditions.

When leucoindigo salt solutions with a high concentration of leucoindigo salt are subjected to evaporation, there is a major tendency to generate foam, and consequent increase in the possibility of undesirable product stripping to steam phase during the purification process.

In the ambit of the present invention, stripping the product to the steam phase during the purification process is an entirely undesirable setback, as it generates big losses in productivity and operating risks of all types, such as occupational, environmental and quality. Further, the use of columns increases the setbacks mentioned, since they are equipped with internal accessories (plates and/or fillings) which will certainly bring complications in the event of process unmanageability, which will surely result in the generation of foam and stripping.

Preferably, the purification vessel of the present invention does not employ mechanisms with countercurrent and/or co-current flows, typical of stripping processes, but rather a fixed bed (product—stationary mass) through which an extraction gas current is passed.

For the inventors of the present application, maintaining the product, with high concentration, confined inside the vessel during the evaporation process proves highly adequate to minimize stripping and adverse effects in the process than the movement/circulation of the product, knowingly necessary in the processes that advocate flows and counter-flows during evaporation.

Inert Gas (Gas Anti-Foaming Agent)

Contrary to what would be expected by a person skilled in the art, it was surprisingly established that the use of an inert gas according to the present invention eliminates the occurrence of foam during the purification process of a leucoindigo salt solution comprising aromatic amines, such as aniline and N-methylaniline, and also reduces to minimum levels the quantity required of one or more liquid anti-foaming agents known by a person skilled in the art in the process. It is also possible not to use these liquid anti-foaming agents.

In the context of the present invention, "inert gas" means any gas that is not reactive with a leucoindigo salt solution. Particularly, the inert gas of the present invention can be selected from the chemical elements from group VIII of the periodic table, such as helium, neon, argon, krypton, and xenon, or to gases N2 and H2.

The inert gas of step (b) of the present process can be any inert gas known in the state of the art. Preferably, the inert gas is N2.

In a preferred embodiment, the inert gas is fed in step (b) at temperatures of −10° C. to 250° C., at flow rates that can vary from 0.1 L/min to 80 L/min, for a mass of 900 g of leucoindigo salt solution to be purified.

Preferably, the injection of inert gas, which acts as anti-foaming agent, should be made directly into the product, with a controlled flow rate, by means of a device submerged at the surface of the stationary mass, so as to promote a homogeneous distribution of this gas throughout the equipment section area.

It was noted that the use of an inert gas such as gas anti-foaming agent has the advantages of:
Reducing costs;
Not leaving residue on the end product, obtaining a product with better quality and increased productivity;
Reducing the productive cycle.

Although the description of the particular embodiments above draw reference to certain embodiments of the process for purifying leucoindigo salt solutions, containing aromatic amines, the present invention may present modifications in its form of implementation, such that the scope of protection of the invention is not limited solely by the content of the accompanying claims, possible equivalent variations being included therein.

EXAMPLES

At the outset, it is important to point out that the purification process of leucoindigo salt solutions, object of the present invention, will be described below according to particular non-limitative embodiments as the embodiments may be realized in different forms and variations and according to the application desired by the person skilled in the art, the scope of the invention being defined according to the claims.

Example 1

To obtain a purified leucoindigo salt solution, comprising undetectable amounts of aromatic amines, a purification vessel was loaded with a leucoindigo salt solution containing aromatic amines.

Next, heating began of said leucoindigo salt solution in order to evaporate the water with the aromatic amines, simultaneously to the continuous injection of an inert gas, acting as gas anti-foaming agent, and to the continuous replenishment of the water, in liquid and/or gas form.

The leucoindigo salt solution obtained presents a content of 0 ppm of aniline.

FIG. 1 shows a block flowchart of Example 1.

Tests

To arrive at the process of the present invention, the inventors performed a series of purification methodology tests, which obtained unsatisfactory results for obtaining or rendering feasible a process for purifying leucoindigo salt solutions, containing aromatic amines, and obtaining an end leucoindigo salt solution with undetectable amounts of said amines.

The following tests illustrate the difficulties to arrive at the process of the present invention.

Test 1

Liquid/Liquid Extraction

As an attempt to purify leucoindigo salt solutions, containing aromatic amines, and obtain an end leucoindigo salt solution with undetectable amounts of said amines, a liquid/liquid extraction test was carried out, using the solvent cyclohexane.

After carrying out said extraction, it was noted that the extraction process would not be viable, since it presented low efficiency and did not achieve undetectable amounts of aromatic amines. Additionally, the extraction process presents a high cost and major security risk, since the solvent to be used is an inflammable product), besides leaving cyclohexane residue in the end product.

Moreover, besides the unsatisfactory purification results, an evaporation step would also be required to eliminate the cyclohexane residue from the end product, which would be necessary for the removal of any other solvent used.

Test 2

Distillation Column—Steam Stripping

In another attempt to purify leucoindigo salt solutions, containing aromatic amines, and to obtain an end leucoindigo salt solution with undetectable amounts of said amines, the stripping purification technique was tested, using distillation column without filling.

In this test, it was noted that the productive cycle doubles with the use of column distillation, a fact caused by the exchange of heat that makes a considerable part of the steam (water plus aromatic amines) leaving the boiling vessel condense on the walls of the column and, contrary to what is desired, returns to the boiling vessel.

In the wake of these unfavorable results, it is concluded that the use of distillation column is not suited for the purpose of purifying leucoindigo salt solutions, containing aromatic amines, by stripping said leucoindigo salt solution to be purified. In corroboration with this conclusion is the fact that the objective of the process of the present invention is not to obtain a steam phase, subsequently condensed, rich in a product of interest, as in other processes that use distillation column with or without filling and/or plates, where part of the steam leaving the boiling vessel, containing the product of interest, returns thereto making the steam increasingly more enriched with the product of interest. On the contrary, the use of distillation column would prove much more suitable if the aim was to obtain a current of aromatic amines purified (steam phase of the distillation process), which would be extracted at the top of the column. In the process of the present invention, the product of interest that is the purified leucoindigo solution, is contained in the boiling vessel and does not have its content of aromatic amines reduced to desired levels.

The increase of the cycle reduces the productivity and increases the costs of the process.

Test 3

Adsorbents

The option to use adsorbents such as activated carbon and diatomite was also tested. A simple test of adding activated carbon or diatomite in the ratio of 1 to 2% on the mass of leucoindigo salt solution, containing aromatic amines, followed by stirring for 1 to 2 hours, at 25° C. or 100° C. No significant adsorption occurred of aromatic amines by the adsorbents.

Test 4

Silicone-Based Anti-Foaming Agent

As already commented upon in the present specification, the use of liquid anti-foaming agents, particularly silicone-based anti-foaming agents, increases the content of insoluble in the purified end leucoindigo salt solution. The greater the dosage of anti-foaming agent, the higher the content of insolubles.

In the tests carried out, the continuous use of a silicone-based anti-foaming agent throughout the entire process of purifying leucoindigo salt solutions, containing aromatic amines, containing a content of said aromatic amines of about 4,000 ppm, caused an increase of insolubles of the range 0.1 to 0.5% in the raw materials to a range greater than 0.5%, depending on the amount of anti-foaming agent dosed.

In a load of 835 grams of leucoindigo solution, 9.4 g of anti-foaming agent was used, which generated an amount of insoluble in the leucoindigo solution free from aniline of 1.2%.

It has to be underlined that the desired specification for insolubles in the end product, after evaporation, is the maximum of 0.5% (data based on a type of anti-foaming agent that is highly efficient in eliminating/preventing foam formation in the leucoindigo salt solution).

The invention claimed is:

1. A process for purifying leucoindigo salt solutions, for removal of aromatic amines, comprising the steps of:
    (a) adding to a purification vessel a leucoindigo salt solution containing aromatic amines;
    (b) bubbling, with a controlled flow rate, an inert gas in the purification vessel on at least three points on a surface of the leucoindigo salt solution, by a device submerged at a surface of a stationary mass of the leucoindigo salt solution;
    (c) injecting, with a controlled flow rate, an extraction gas current into the purification vessel; and
    (d) recovering a purified leucoindigo salt solution from the purification vessel;
    wherein the purified leucoindigo salt solution, recovered after step (d), contains undetectable amounts of aromatic amines.

2. The process according to claim 1, wherein the process is a process of extraction by stripping.

3. The process according to claim 1, wherein the aromatic amines are aniline and N-methylaniline.

4. The process according to claim 1, wherein the leucoindigo salt solution of step (a) comprises an alkaline metal salt, or an alkaline metal salt mixture.

5. The process according to claim 1, wherein the bubbling of step (b) promotes a homogeneous distribution of the inert gas throughout the surface of the leucoindigo salt solution.

6. The process according to claim 1, wherein the inert gas of step (b) is selected from helium, neon, argon, krypton, xenon, $N_2$ and $H_2$.

7. The process according to claim 1, wherein the inert gas of step (b) is fed at a flow rate of 5 to 8 $Nm^3/h$.

8. The a according to a claim 1, wherein the extraction gas current of step (c) is live steam.

9. The according to claim 1, wherein the extraction gas current of step (c) is fed at a flow rate of 500 to 2000 kg/h.

10. The process according to claim 9, wherein the extraction gas current of step (c) is fed by the device submerged in the stationary mass, which promotes a homogeneous distribution of the extraction gas current throughout the surface of the leucoindigo salt solution through the bottom of the purification vessel.

11. The process according to claim 1, wherein a vacuum is used with steps (b) and (c).

12. The process according to claim 1, wherein the process is carried out in the absence of liquid anti-foaming agents.

13. The process according to claim 1, wherein the inert gas of step (b) is a gas anti-foaming agent.

* * * * *